(12) United States Patent
Suzuki et al.

(10) Patent No.: US 11,085,842 B2
(45) Date of Patent: Aug. 10, 2021

(54) STRAIN GENERATION BODY AND FORCE SENSOR EQUIPPED WITH STRAIN GENERATION BODY

(71) Applicant: NIDEC COPAL ELECTRONICS CORPORATION, Tokyo (JP)

(72) Inventors: Takashi Suzuki, Sano (JP); Shigeaki Shingyochi, Sano (JP); Toyohiko Akata, Sano (JP); Subei Shun, Sano (JP)

(73) Assignee: NIDEC COPAL ELECTRONICS CORPORATION, Tokyo (JP)

( * ) Notice: Subject to any disclaimer, the term of this patent is extended or adjusted under 35 U.S.C. 154(b) by 188 days.

(21) Appl. No.: 16/374,068

(22) Filed: Apr. 3, 2019

(65) Prior Publication Data

US 2019/0226929 A1    Jul. 25, 2019

Related U.S. Application Data

(63) Continuation of application No. PCT/JP2017/035637, filed on Sep. 29, 2017.

(30) Foreign Application Priority Data

Dec. 9, 2016 (JP) .............................. JP2016239668

(51) Int. Cl.
*G01L 5/00* (2006.01)
*G01L 5/1627* (2020.01)
(Continued)

(52) U.S. Cl.
CPC .............. *G01L 5/1627* (2020.01); *G01L 1/22* (2013.01); *G01L 1/2206* (2013.01); *G01L 1/26* (2013.01); *G01L 3/108* (2013.01)

(58) Field of Classification Search
CPC ......... G01L 5/161; G01L 1/22; G01L 1/2206; G01L 1/26; G01L 3/108; G01L 5/16
(Continued)

(56) References Cited

U.S. PATENT DOCUMENTS 4,695,963 A * 9/1987 Sagisawa ............... B25J 13/081
                                                        414/5
4,771,638 A * 9/1988 Sugiyama ............. G01L 9/0042
                                                        338/4

(Continued)

FOREIGN PATENT DOCUMENTS

CN    104364625    2/2015
CN    205451003    8/2016
(Continued)

OTHER PUBLICATIONS

Office Action Issued in Corresponding CN Application No. 2017800601452, dated May 26, 2020.
(Continued)

*Primary Examiner* — Max H Noori
(74) *Attorney, Agent, or Firm* — Burris Law, PLLC

(57) ABSTRACT

A strain generation body and a force sensor equipped with the strain generation body, which can reduce a temperature error between strain sensors and reference resistors and the influence of external noise and which can improve detection accuracy, are provided. A strain generation body comprises a center part, an outer-peripheral part, connecting parts, a plurality of strain sensors, a plurality of reference resistors. The outer-peripheral part surrounds a periphery of the center part. The connecting parts connect the center part and the outer-peripheral part. The strain sensors are provided on main surfaces of the connecting parts. The reference resistors are provided on a main surface of the center part and constitute bridge circuits together with the strain sensors.

11 Claims, 10 Drawing Sheets

(51) Int. Cl.
*G01L 1/22* (2006.01)
*G01L 3/10* (2006.01)
*G01L 1/26* (2006.01)

(58) Field of Classification Search
USPC .................................................. 73/862.044
See application file for complete search history.

(56) References Cited

U.S. PATENT DOCUMENTS

| | | | |
|---|---|---|---|
| 6,886,415 | B1 | 5/2005 | Kurogi et al. |
| 7,490,524 | B2 * | 2/2009 | Ohsato ..................... G01L 5/162 |
| | | | 73/862.629 |
| 2007/0006668 | A1 | 1/2007 | Hirabayashi et al. |
| 2007/0151356 | A1 * | 7/2007 | Sumigawa ............... G01B 7/18 |
| | | | 73/777 |
| 2007/0240524 | A1 * | 10/2007 | Speckhart ......... B60R 21/01516 |
| | | | 73/862.381 |
| 2008/0276726 | A1 | 11/2008 | Rey |
| 2013/0340537 | A1 | 12/2013 | Freiwald et al. |
| 2019/0310146 | A1 * | 10/2019 | Suzuki .................... G01L 3/108 |
| 2019/0376856 | A1 * | 12/2019 | Shun ..................... G01L 1/2237 |

FOREIGN PATENT DOCUMENTS

| | | |
|---|---|---|
| EP | 1739401 | 1/2007 |
| JP | S6469927 | 3/1989 |
| JP | 2004239621 | 8/2004 |
| JP | 2007010379 | 1/2007 |
| JP | 2008533481 | 8/2008 |
| JP | 2013061305 | 4/2013 |
| JP | 2015049209 | 3/2015 |
| WO | 2005045388 | 5/2005 |

OTHER PUBLICATIONS

International Search Report for International Application PCT/JP2017/035637, dated Dec. 26, 2017.

* cited by examiner

FIG. 5

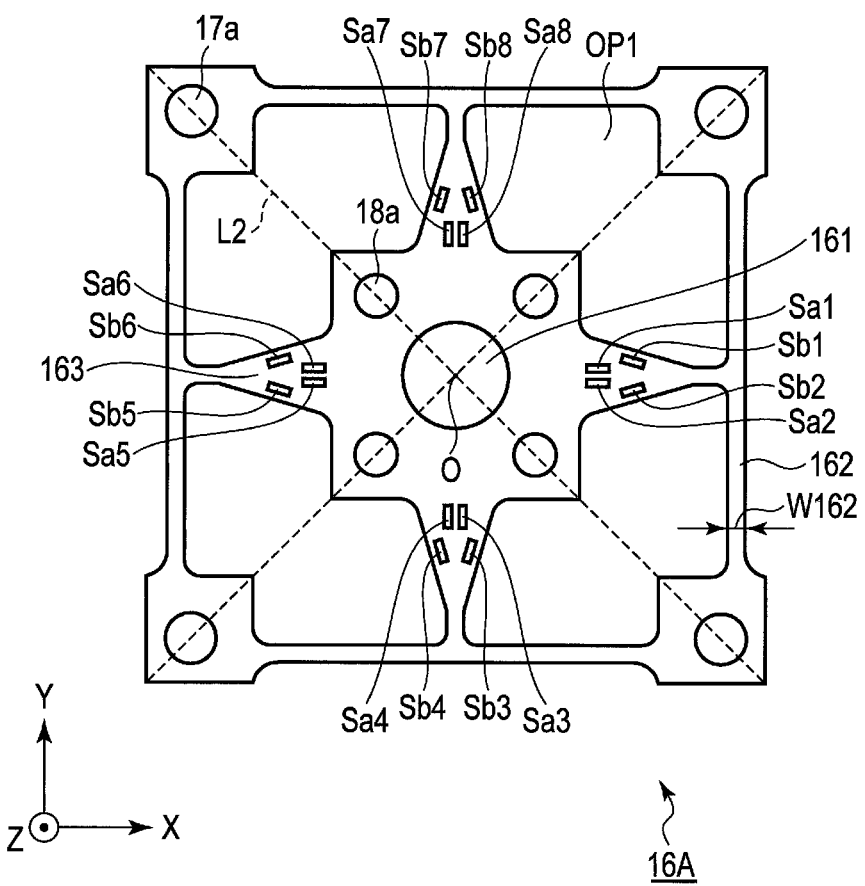
F I G. 7

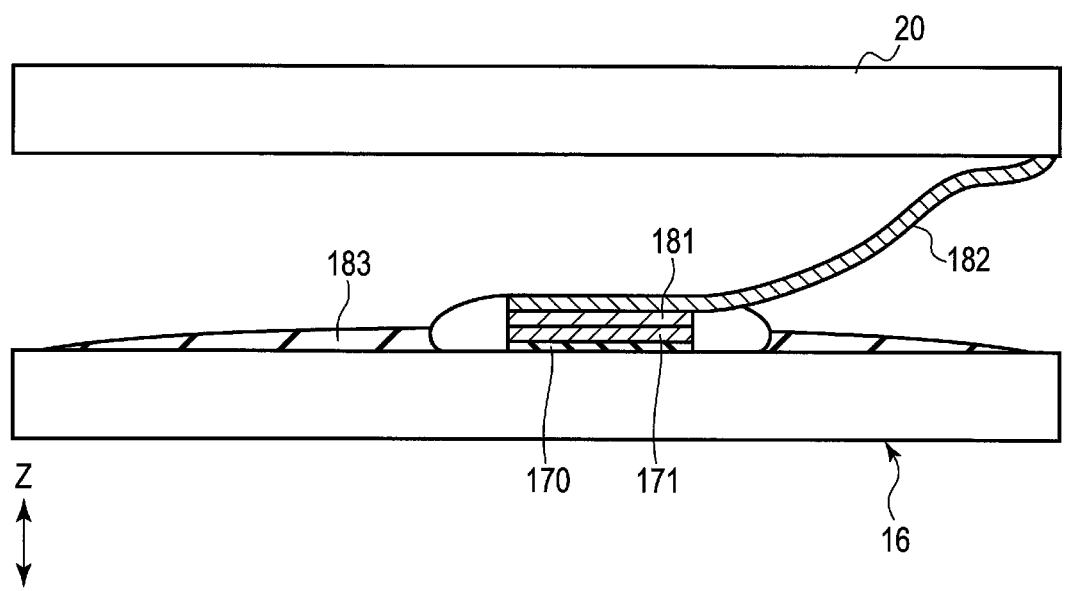
F I G. 12

STRAIN GENERATION BODY AND FORCE SENSOR EQUIPPED WITH STRAIN GENERATION BODY

CROSS-REFERENCE TO RELATED APPLICATIONS

This application is a continuation of International Application No. PCT/JP2017/035637, filed on Sep. 29, 2017, which claims priority to and the benefit of Japanese Patent Application No. 2016-239668 filed on Dec. 9, 2016. The disclosures of the above applications are incorporated herein by reference.

FIELD

The present disclosure relates to, for example, a six-axis force sensor equipped with a strain generation body which is applicable to a robot arm.

BACKGROUND

The statements in this section merely provide background information related to the present disclosure and may not constitute prior art.

Six-axis force sensors which are used in, for example, robot arms, and which detect external force and torque in X, Y, and Z directions have been known (refer to, for example, Patent Literature 1 (JP 2015-49209 A) and Patent Literature 2 (JP 2013-61305 A)).

In these force sensors, external force applied to force receiving bodies as movable parts is transmitted to strain generation bodies, and deformation of strain sensors (strain gauges) provided on the strain generation bodies are converted into electrical signals and are detected.

SUMMARY

However, it is not easy to provide the strain sensors, which are highly sensitive, on the strain generation bodies with high density and high accuracy. Therefore, it has been hard to provide reference resistors for constituting bridge circuits together with the strain sensors integrally on the strain generation bodies. As a result, a temperature error between the strain sensors and the reference resistors and the influence of external noise increase, and thus, detection accuracy decreases.

Moreover, in order to supplement the detection accuracy, it has been necessary to dispose a larger number of strain sensors, and it also has been necessary to attach the strain sensors, for example, on side surfaces of the strain generation bodies with adhesive, etc., as well as on surfaces of the strain generation bodies.

The embodiments of the present invention provide a strain generation body and a force sensor equipped with the strain generation body, which can reduce a temperature error between strain sensors and reference resistors and the influence of external noise and which can improve detection accuracy.

A strain generation body according to an embodiment comprises a center part, an outer-peripheral part which surrounds a periphery of the center part, a plurality of connecting parts which connect the center part and the outer-peripheral part, a plurality of strain sensors which are provided on main surfaces of the connecting parts, and a plurality of reference resistors which are provided on a main surface of the center part and which constitute bridge circuits together with the strain sensors.

The present invention can provide a strain generation body and a force sensor equipped with the strain generation body, which can reduce a temperature error between strain sensors and reference resistors and the influence of external noise and which can improve detection accuracy.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 5 is a table for explaining bridge circuits of the strain generation body according to the first embodiment.

FIG. 7 is a plan view showing the whole structure of a strain generation body according to a second embodiment.

FIG. 12 is a sectional view showing the strain generation body in the state of being mounted in the force sensor.

Figure 1:
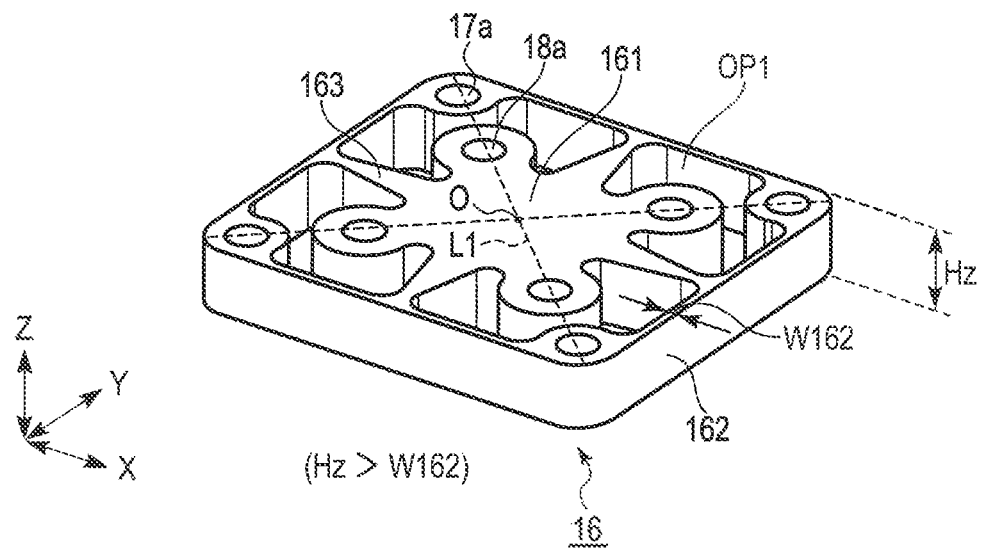
FIG. 1 is a perspective view showing the whole structure of a strain generation body according to a first embodiment.

The drawings described herein are for illustration purposes only and are not intended to limit the scope of the present disclosure in any way.

DETAILED DESCRIPTION

Embodiments will be described hereinafter with reference to the drawings. In the following description, substantially the same functions and elements will be denoted by the same reference numerals, and will be described as necessary. In addition, the drawings are schematic, and the relationship between thicknesses and planar dimensions, the ratio between the thicknesses of layers, etc., may be different from those in reality.

First Embodiment

[Structure]

Whole Structure

Figure 2:
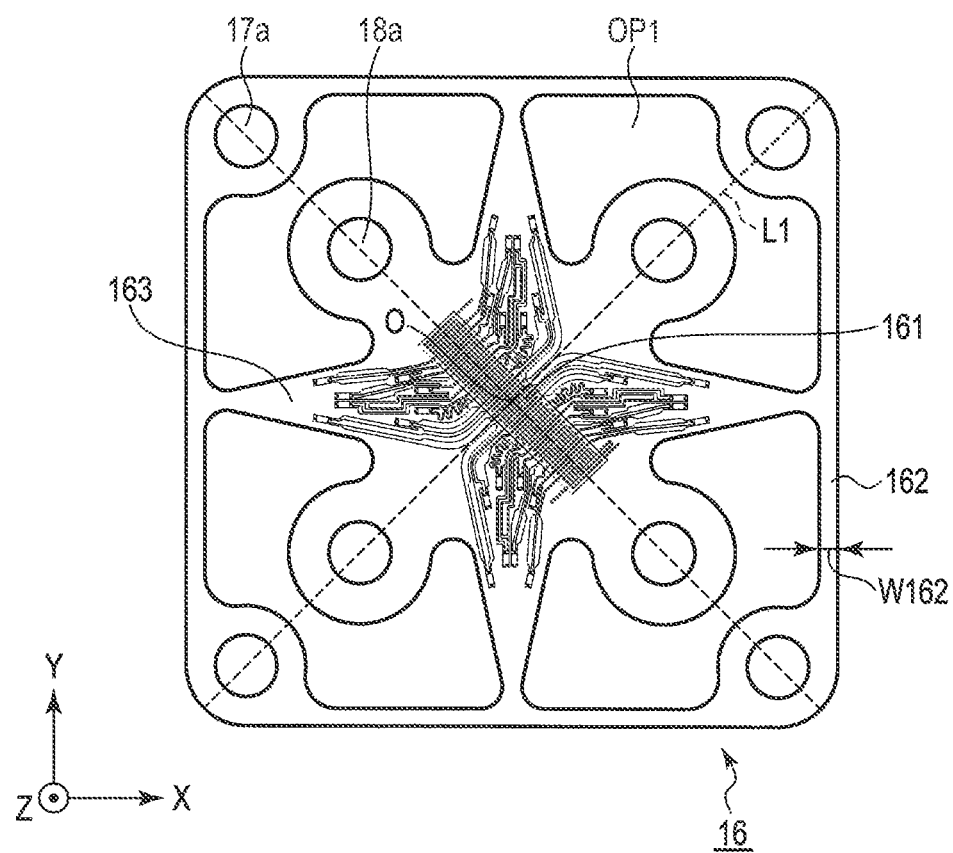
FIG. 2 is a plan view showing the planar structure of the strain generation body of FIG. 1.

The whole structure of a strain generation body according to a first embodiment will be described with reference to FIG. 1 and FIG. 2. FIG. 1 is a perspective view showing the whole structure of the strain generation body according to the first embodiment. FIG. 2 is a plan view showing the planar structure of the strain generation body of FIG. 1.

As shown in FIG. 1 and FIG. 2, a strain generation body 16 according to the first embodiment comprises a center part 161, an outer-peripheral part 162 which surrounds the periphery of the center part 161, and four connecting parts 163 which connect the center part 161 and the outer-peripheral part 162. The strain generation body 16 is formed of, for example, a predetermined metal such as stainless steel.

The center part 161 includes a center O, which is the intersection of two diagonal lines L1 connecting the corner parts of the outer-peripheral part 162. In addition, in the center part 161, a plurality of reference resistors for constituting bridge circuits, which will be described later, are provided. In the corner parts of the center part 161, four screw holes 18a for fixing a first support member (not shown in the figures), which is an external member, are provided. Each of the screw holes 18a is provided so as to project in a hollow part OP1 from the center side to the outside along the directions of the diagonal lines L1 in order to save space.

In the corner parts of the outer-peripheral part 162, four screw holes 17a for fixing a second support member (not shown in the figures), which is an external member and is different from the first support member, are provided. Each of the screw holes 17a is provided so as to project in the hollow part OP1 from the outside to the center side along the directions of the diagonal lines L1 in order to save space.

The four connecting parts 163 are provided radially from the center O along directions different from the directions of the diagonal lines L1. In the connecting parts 163, a plurality of strain sensors for detecting external force and torque in X, Y, and Z directions, which are not herein shown in the figures, are provided. The width of the connecting parts 163 becomes smaller from the center O toward the outside.

In addition, the height Hz of the strain generation body 16 along the Z direction is common to the center part 161, the outer-peripheral part 162, and the connecting parts 163, and thus is substantially the same. The height Hz of the strain generation body 16 is greater than the width W162 of the outer-peripheral part 162 along the X direction or the Y direction (Hz>W162).

Moreover, the elasticity of the outer-peripheral part 162 and the connecting parts 163 is greater than the elasticity of the center part 161. More preferably, the outer-peripheral part 162 and the connecting parts 163 have an elastic function, and the center part 161 does not have an elastic function. The elastic function herein means the function of actively causing elastic deformation with input external force and torque.

More specifically, the amount of strain of the elastic deformation of the center part 161 is, preferably, less than or equal to $3 \times 10^{-6}$ at a rated load, and more preferably, less than or equal to $1 \times 10^{-6}$. The elastic deformation of the connecting parts (beam parts) 163 is within the elastic limit of a material at a rated load, and the amount of strain is, preferably, greater than or equal to $2 \times 10^{-5}$, and more preferably, greater than or equal to $2 \times 10^{-4}$. The elastic deformation of the outer-peripheral part 162 is within the elastic limit of a material at a rated load, and the amount of flexure of the most flexed portion is, preferably, greater than or equal to 20 μm, and more preferably, greater than or equal to 50 μm.

Detailed Structure

Figure 3:
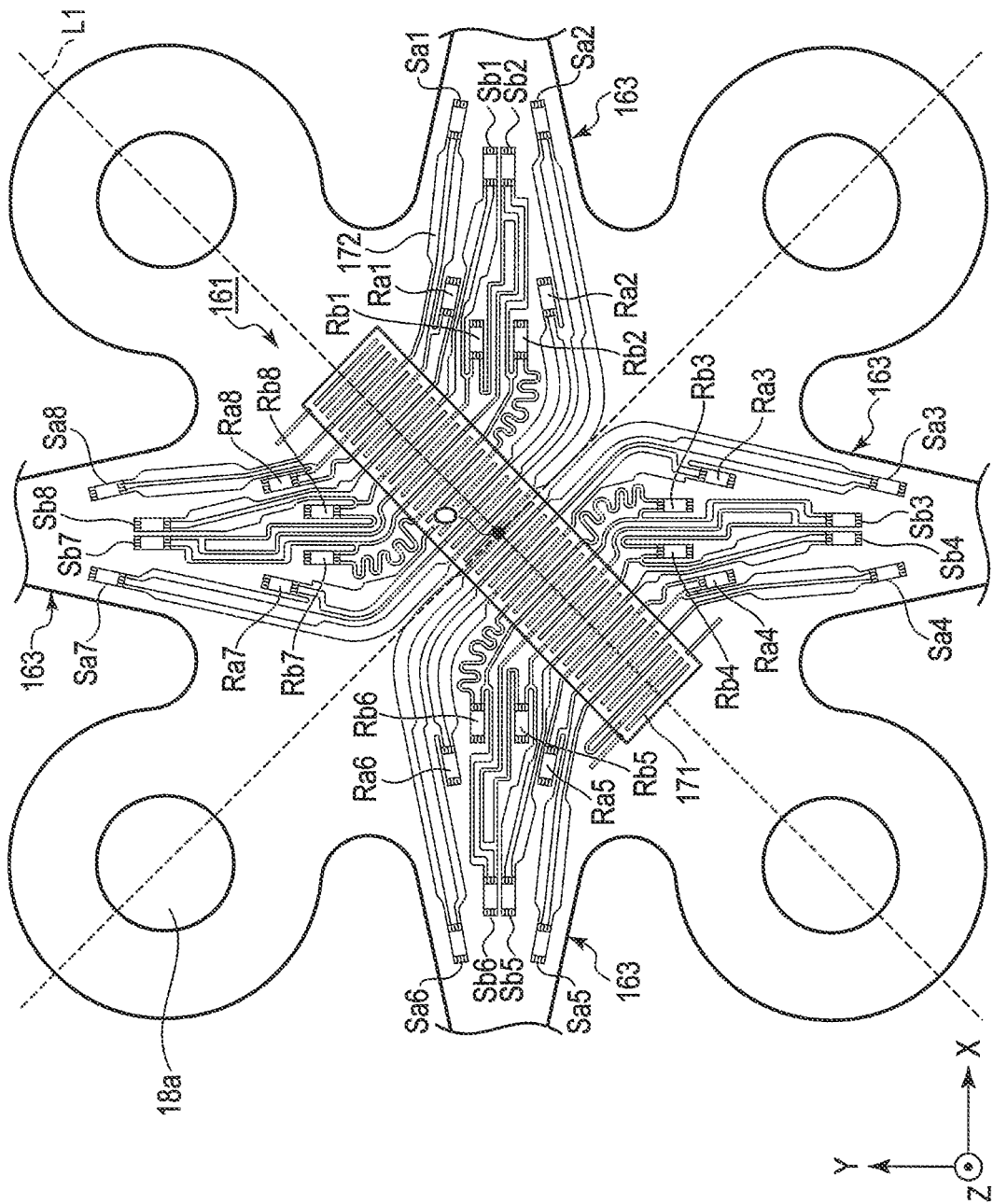
FIG. 3 is a plan view showing a center part and connecting parts from the perspective of a main surface side of the strain generation body in detail of FIG. 1.

The detailed planar structure of the strain generation body 16 according to the first embodiment will be described with reference to FIG. 3. FIG. 3 is a plan view showing the center part 161 and the connecting parts 163 from the perspective of the main surface side of the strain generation body 16, on which the strain sensors, etc., are provided, in detail.

As shown in FIG. 3, 16 strain sensors (strain gauges) Sa1, Sb1, Sa2, Sb2, Sa3, Sb3, Sa4, Sb4, Sa5, Sb5, Sa6, Sb6, Sa7, Sb7, Sa8, and Sb8 are provided on the main surfaces of the connecting parts 163. The strain sensors Sa1 to Sb8 are metallic thin-film resistors as will be described later, and are, for example, resistors (Cr—N resistors) including chromium (Cr) and nitrogen (N). Thus, the strain sensors Sa1 to Sb8 can be disposed at desired positions only by patterning as will be described later. In addition, since the temperature coefficients of the Cr—N resistors are small, temperature compensation can easily be made. The strain sensors Sa1 to Sb8 are disposed so that their longitudinal parts are inclined approximately 45° with respect to the diagonal lines L1.

16 reference resistors Ra1, Rb1, Ra2, Rb2, Ra3, Rb3, Ra4, Rb4, Ra5, Rb5, Ra6, Rb6, Ra7, Rb7, Ra8, and Rb8 are provided on the main surface of the center part 161. The reference resistors Ra1 to Rb8 have substantially the same shapes as the strain sensors Sa1 to Sb8, and are disposed so that their longitudinal parts are inclined approximately 45° with respect to the diagonal lines L1. Moreover, electrodes 171 are provided on the main surface of the center part 161 along one of the directions of the diagonal lines L1 of the center part 161.

The strain sensors Sa1 to Sb8 and the reference resistors Ra1 to Rb8 are electrically connected to the electrodes 171 and wiring 172 provided on the main surface so as to constitute eight bridge circuits, which will be described later. The line width of the wiring 172 is small in portions connecting the strain sensors Sa1 to Sb8 and the reference resistors Ra1 to Rb8. In the other portions, the line width is large as compared to the connecting portions in order to reduce wiring resistance.

Moreover, the strain sensors Sa1 to Sb8, the reference resistors Ra1 to Rb8, the electrodes 171, and the wiring 172 are integrally formed on the same main surface using a manufacturing method employing a thin-film technique, which will be described later. Thus, the strain sensors Sa1 to Sb8, the reference resistors Ra1 to Rb8, the electrodes 171, and the wiring 172 are laid out so as to be mirror-symmetrical with respect to the diagonal lines L1 of the strain generation body 16.

Figure 4:
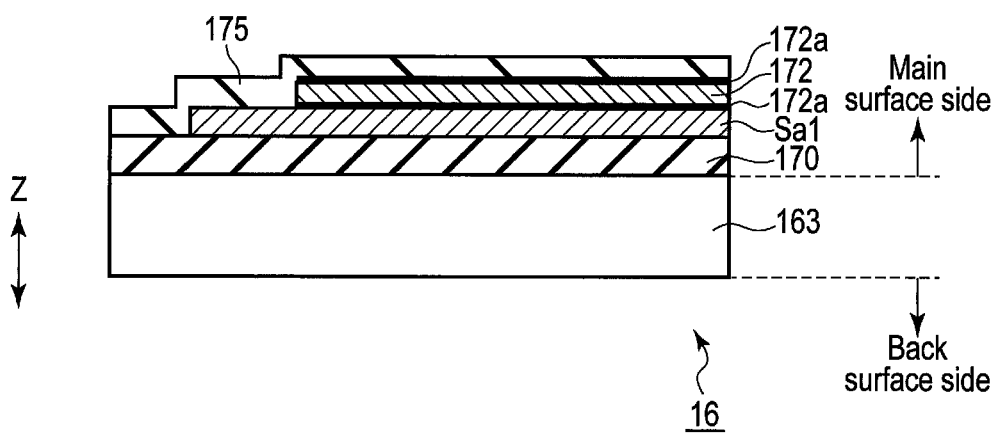
FIG. 4 is a sectional view of a connecting part including a strain sensor of FIG. 3.

The detailed sectional structure of the strain generation body 16 will be described with reference to FIG. 4. FIG. 4 is a sectional view of the connecting part 163 including the strain sensor Sa1 of FIG. 3.

As shown in FIG. 4, an insulating film 170 is provided on the main surface of the connecting part 163. The strain sensor Sa1, which is a Cr—N resistor as a strain sensitive film, is provided on the insulating film 170. The wiring 172, which is an electrode lead film formed of copper (Cu), is provided on the strain sensor Sa1. An over-glass (OG) film 175 is provided so as to cover the strain sensor Sa1 and the wiring 172. In addition, an adhesive film 172a including chromium (Cr) to improve adhesion is provided on the interface between the wiring 172 and the strain sensor Sa1 and the interface between the wiring 172 and the OG film 175.

Although not shown in this section, the electrodes 171 are provided at an end portion of the wiring 172 in the center part 161. The electrodes 171 are formed of a multilayer structure of copper (Cu) and gold (Au) sequentially provided on the adhesive film 172a.

Bridge Circuits

Figure 5:
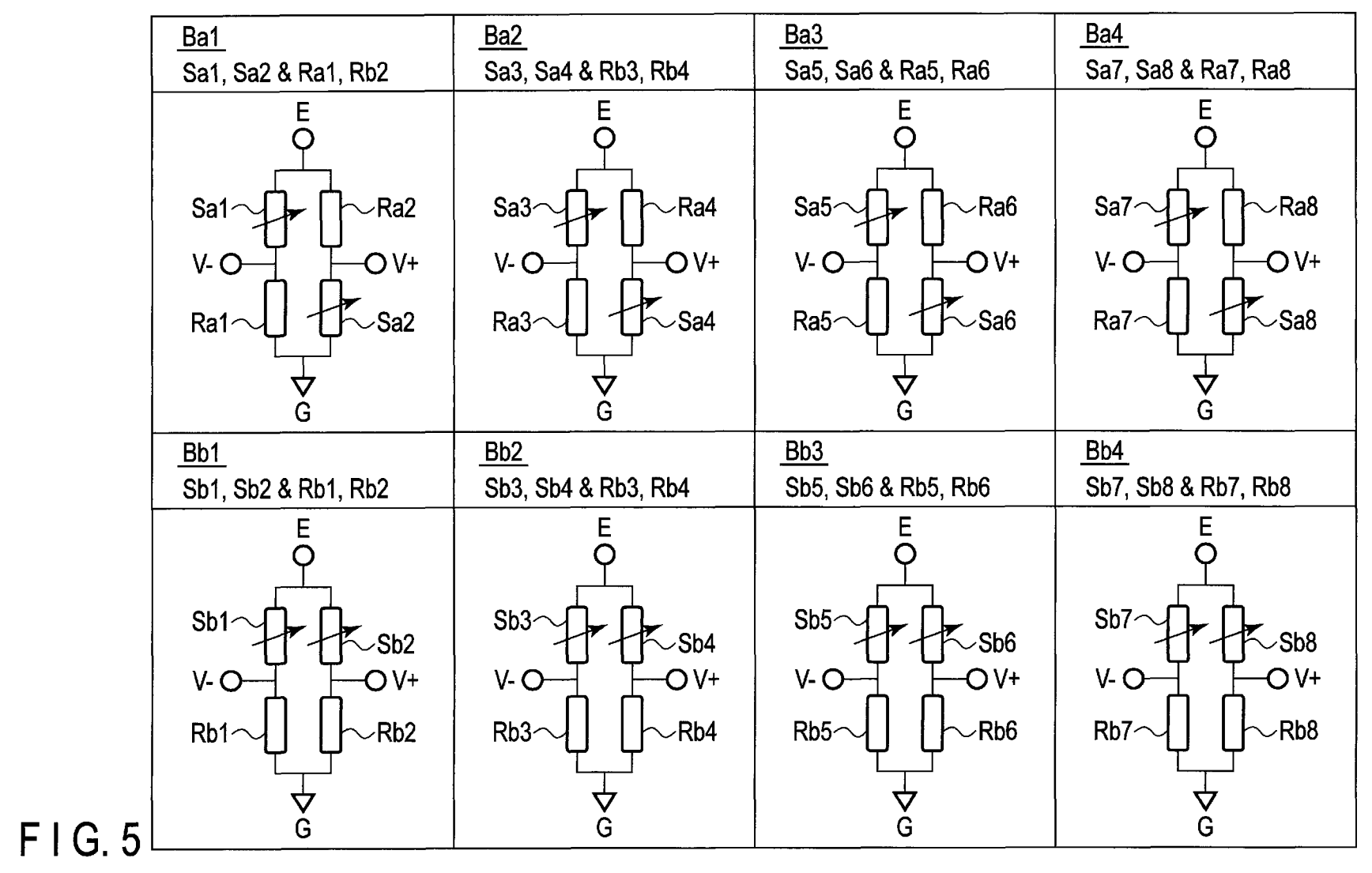

The bridge circuits of the strain generation body 16 according to the first embodiment will be described with reference to FIG. 5. FIG. 5 is a table for explaining the bridge circuits of the strain generation body 16 according to the first embodiment.

As shown in FIG. 5, the strain generation body 16 includes eight bridge circuits Ba1, Ba2, Ba3, Ba4, Bb1, Bb2, Bb3, and Bb4.

The bridge circuit Ba1 comprises the strain sensors Sa1 and Sa2 and the reference resistors Ra1 and Ra2. The strain sensor Sa1 and the reference resistor Ra1 are connected in series, and the reference resistor Ra2 and the strain sensor Sa2 are connected in series. The strain sensor Sa1 and the reference resistor Ra1, which are connected in series, and the reference resistor Ra2 and the strain sensor Sa2, which are connected in series, are connected in parallel between a power supply terminal E and a ground G. One terminal V− is connected to a connection node between the strain sensor Sa1 and the reference resistor Ra1. The other terminal V+ is connected to a connection node between the reference resistor Ra2 and the strain sensor Sa2. The other bridge circuits Ba2 to Ba4 also have the same structure as the bridge circuit Ba1.

The bridge circuit Bb1 comprises the strain sensors Sb1 and Sb2 and the reference resistors Rb1 and Rb2. The strain sensor Sb1 and the reference resistor Rb1 are connected in series, and the strain sensor Sb2 and the reference resistor Rb2 are connected in series. The strain sensor Sb1 and the reference resistor Rb1, which are connected in series, and the strain sensor Sb2 and the reference resistor Rb2, which are connected in series, are connected in parallel between a power supply terminal E and a ground G. One terminal V− is connected to a connection node between the strain sensor Sb1 and the reference resistor Rb1. The other terminal V+ is connected to a connection node between the strain sensor Sb2 and the reference resistor Rb2. The other bridge circuits Bb2 to Bb4 also have the same structure as the bridge circuit Bb1.

In the above-described structure, when force and torque are applied from the outside, the position of the center part 161 changes relatively to the position of the outer-peripheral part 162. Thus, the connecting parts 163 are deformed according to the force and the torque. In accordance with the deformation of the connecting parts 163, stress is applied to each of the strain sensors Ra1 to Ra8 provided in the connecting parts 163, and the balance of the voltages of the terminals V− and V+ of each of the bridge circuits Ba1 to Bb4 is lost. Thus, a detection signal according to the force and the torque is detected.

[Manufacturing Method]

Figure 6:
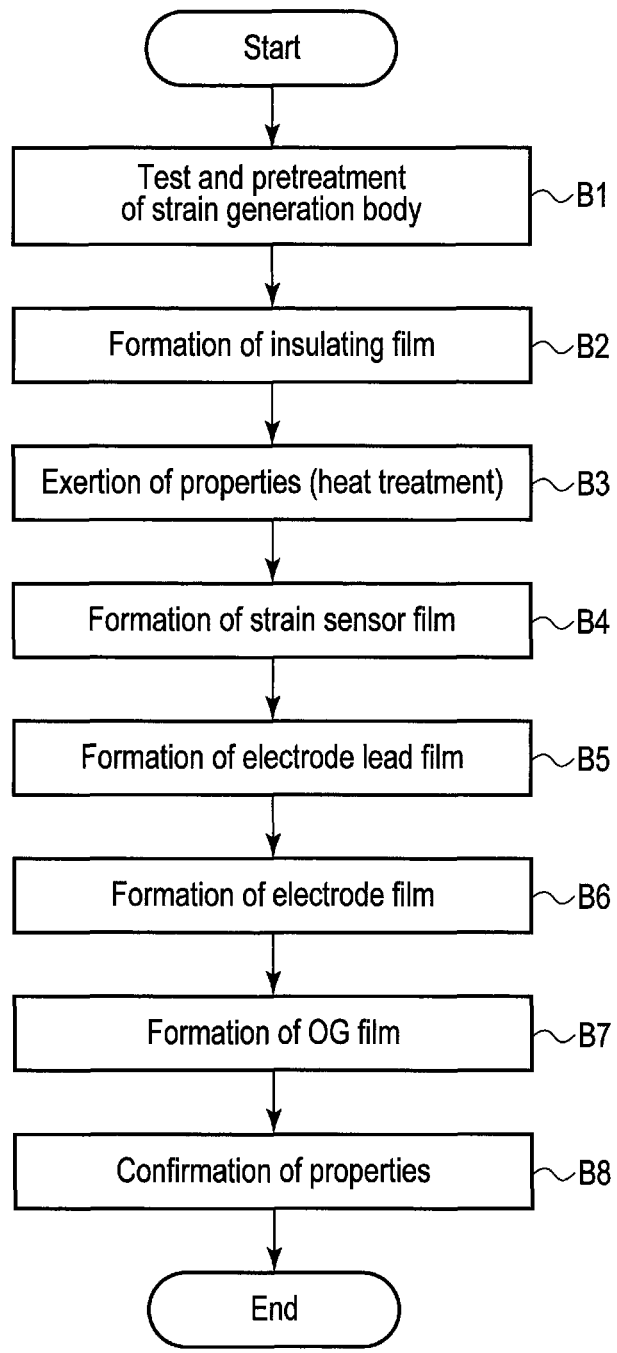
FIG. 6 is a flowchart for explaining a manufacturing method of the strain generation body according to the first embodiment.

A manufacturing method of the strain generation body 16 according to the first embodiment will be described with reference to FIG. 6. FIG. 6 is a flowchart for explaining the manufacturing method of the strain generation body 16 according to the first embodiment.

As shown in FIG. 6, a predetermined test such as a test of the dimensions of the strain generation body 16 is first carried out, and then, the strain generation body 16 is subjected to predetermined pretreatment. The pretreatment includes, for example, washing treatment washing the main surface of the strain generation body 16 after the test, using ultrasonic waves and a predetermined agent, etc., (B1).

Then, the insulating film 170 is formed on the main surface of the strain generation body 16 after the pretreatment by, for example, a thermal oxidation processing (B2).

Next, the strain generation body 16 is subjected to heat treatment, for example, annealing treatment, and the properties of the formed insulating film 170 are improved (B3).

Then, a Cr—N thin film including chromium (Cr) and nitrogen (N) is formed on the insulating film 170 by, for example, a sputtering method using a predetermined target. Moreover, the Cr—N thin film is coated with a photoresist, and the photoresist is patterned. Specifically, patterns having the same planar shapes as the reference resistors Ra1 to Rb8 are transferred to the photoresist at the positions where the reference resistors Ra1 to Rb8 are disposed in the center part 161, and patterns having the same planar shapes as the strain sensors Sa1 to Sb8 are transferred to the photoresist at the positions where the strain sensors Sa1 to Sb8 are disposed in the connecting parts 163. Then, the photoresist except the portions to which the patterns have been transferred is removed. Moreover, the Cr—N thin film is etched to the surface of the insulating film 170 using the photoresist, to which the patterns have been transferred, as a mask. The reference resistors Ra1 to Rb8 and the strain sensors Sa1 to Sb8 are thereby formed at the predetermined positions in the center part 161 and the connecting parts 163 (B4).

Then, the adhesive film 172a formed of a chromium (Cr) thin film is formed on the center part 161 and the connecting parts 163, to improve adhesion, by using, for example, the same manufacturing step as step B4 described above. A predetermined electrode lead film including copper (Cu) is formed on the adhesive film 172a, and the wiring 172 for electrically connecting the strain sensors Sa1 to Sb8 and the reference resistors Ra1 to Rb8 is formed. Moreover, the adhesive film 172a formed of the chromium thin film is formed on the wiring 172 by the same manufacturing step (B5).

Then, as shown in FIG. 3, the electrodes 171 are formed in the center part 161. That is, on the adhesive film 172a shown in FIG. 4, a multilayer structure including copper (Cu) and gold (Au) is sequentially formed and the electrodes 171 are formed by, for example, the same manufacturing step as step B4 described above (B6).

Then, the OG film 175 is formed on the main surface of the strain generation body 16 except on the electrodes 171 by, for example, a chemical vapor deposition (CVD) method (B7).

Next, a test of strain properties, a stress test, etc., of the strain sensors Sa1 to Sb8 formed on the main surface of the strain generation body 16, etc., are carried out, and the properties required of the formed strain sensors Sa1 to Sb8, etc., are confirmed (B8).

By the above-described manufacturing method, the strain generation body 16 according to the first embodiment is manufactured.

[Advantageous Effects]

As described above, the strain generation body 16 according to the first embodiment comprises the reference resistors Ra1 to Rb8, which are provided on the main surface of the center part 161 where substantially no strain occurs, and which constitute the bridge circuits Ba1 to Bb4 together with the strain sensors Sa1 to Sb8 (FIG. 3). Thus, the reference resistors Ra1 to Rb8 are provided on the main surface of the same strain generation body 16 as the strain sensors Sa1 to Sb8. Accordingly, a temperature error between the strain sensors Sa1 to Sb8 and the reference resistors Ra1 to Rb8 and the influence of external noise can be reduced, and detection accuracy can be improved.

Moreover, the strain sensors Sa1 to Sb8, the reference resistors Ra1 to Rb8, the electrodes 171, and the wiring 172 are disposed so as to be mirror-symmetrical with respect to the diagonal lines L1 of the strain generation body 16 (FIG. 3). Thus, the strain sensors Sa1 to Sb8, etc., can be disposed in a small space of the center part 161 and the connecting parts 163 in an optimum way.

Moreover, the strain sensors Sa1 to Sb8, the reference resistors Ra1 to Rb8, the electrodes 171, and the wiring 172, which are necessary to constitute the bridge circuits Ba1 to Bb4, are provided only on the main surface of the strain generation body 16 by a manufacturing method employing a thin-film technique (FIG. 4 and FIG. 6). Thus, the sensors Sa1 to Sb8, which are highly sensitive, can be provided in the connecting parts 163 of the strain generation body 16 with high density and high accuracy. Therefore, it is unnecessary to dispose a large number of (for example, approximately 90) strain sensors to supplement detection accuracy, and it is also unnecessary to attach the strain sensors, for example, on the side surface of the strain generation body, with adhesive, etc., as well as on the surface of the strain generation body. For example, if a manufacturing method as in the present embodiment is not used, an error of approximately several hundred micrometers from a desired position can be caused in the positions of the strain sensors. Thus, the influence of multiaxial interference, in which force and torque other than those along a predetermined axis are detected, increases. In addition, for example, if the reference resistors are provided outside the strain generation body, a temperature error and external noise increase. Thus, it is also necessary to correct the temperature error and the external noise. However, in the present embodiment, such inconvenience is not caused.

In addition, the height Hz of the strain generation body 16 along the Z direction is substantially the same in the center part 161, the outer-peripheral part 162, and the connecting parts 163. The height Hz of the strain generation body 16 is greater than the width W162 of the outer-peripheral part 162 along the X direction or the Y direction (Hz>W162). Moreover, the elasticity of the outer-peripheral part 162 and the connecting parts 163 is greater than the elasticity of the center part 163. Preferably, the outer-peripheral part 162 and the connecting parts 163 have an elastic function, and the center part 163 does not have an elastic function. By virtue of the above-described structure, each output gain and each rigidity along the X, Y, and Z axes can be more appropriately adjusted.

Second Embodiment [Example of Other Shapes of Strain Generation Body]

A strain generation body 16A according to a second embodiment will be described with reference to FIG. 7. FIG. 7 is a plan view showing the planar structure of the strain generation body 16A according to the second embodiment. The second embodiment relates to an example of other shapes of the strain generation body.

As shown in FIG. 7, each corner part of a center part 161 and an outer-peripheral part 162 of the strain generation body 16A has a substantially right-angled shape. This shape is different from that of the strain generation body 16 according to the first embodiment. Strain sensors Sa1 to Sb8 are provided in coupling parts 163 as in the first embodiment. In FIG. 7, reference resistors and the other structures are omitted.

The second embodiment is substantially the same as the above-described first embodiment, and thus, a detailed description of its structure is omitted. In addition, the operations are also substantially the same as those in the first embodiment, and a detailed description thereof is omitted.

[Advantageous Effects]

According to the structures and the operations of the strain generation body 16A according to the second embodiment, at least the same advantageous effects as those of the first embodiment can be obtained. In addition, the strain generation body 16A according to the second embodiment can be applied to a force sensor as necessary.

Third Embodiment [Example of Strain Generation Body of Three-Beam System]

Figure 8:
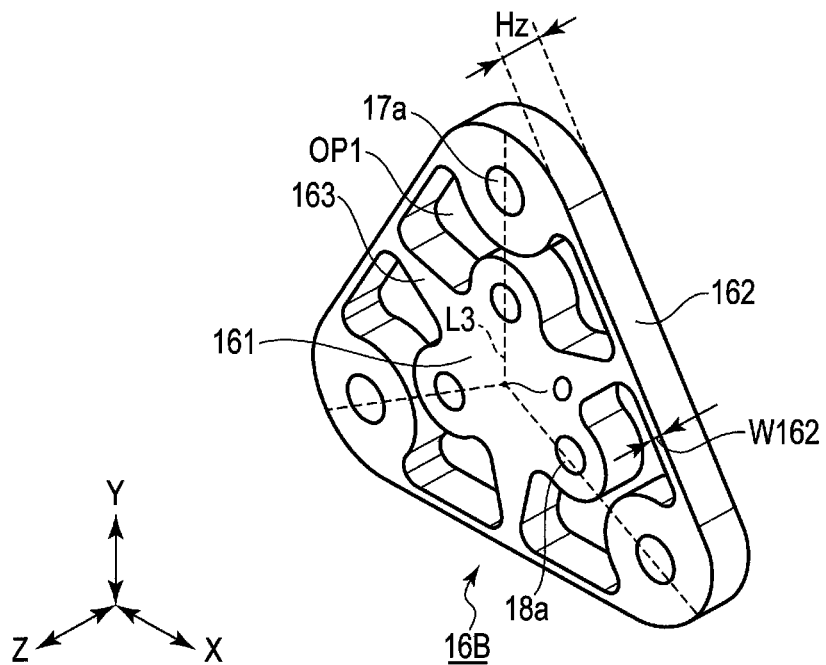
FIG. 8 is a perspective view showing the whole structure of a strain generation body according to a third embodiment.
Figure 9:
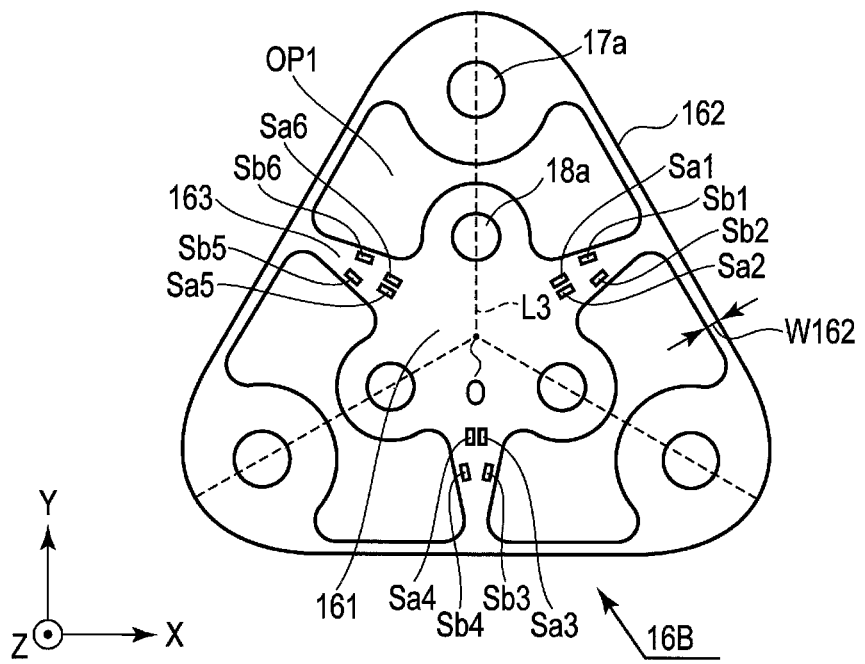
FIG. 9 is a plan view showing the planar structure of the strain generation body of FIG. 8.

A strain generation body 16B according to a third embodiment will be described with reference to FIG. 8 and FIG. 9. FIG. 8 is a perspective view showing the whole structure of the strain generation body 16B according to the third embodiment. FIG. 9 is a plan view showing the planar structure of the strain generation body 16B of FIG. 8. The third embodiment relates to an example of a strain generation body of a three-beam (connecting part) system.

The first and second embodiments represent strain generation bodies of a four-beam system including four connecting parts 163.

In contrast, the strain generation body 16B according to the third embodiment shown in FIG. 8 and FIG. 9 is a strain generation body of a three-beam system including three connecting parts 163. Thus, unlike in the first embodiment, a total of 12 strain sensors Sa1 to Sb6 are provided on the three connecting parts 163. Accordingly, the number of reference resistors which are provided so as to correspond to the strain sensors Sa1 to Sb6 is also 12. In FIG. 8 and FIG. 9, the reference resistors are omitted.

The planar shape of an outer-peripheral part 161 of the strain generation body 16B is a triangular shape having three corner parts provided in the directions of three diagonal lines L3 as vertices. In addition, the corner parts of the outer-peripheral part 161 contact a circle whose radius is the diagonal lines L3, and the corner parts are provided with screw holes 17a, respectively.

The structures and operations are substantially the same as those in the first embodiment, and thus, a detailed description thereof is omitted.

[Advantageous Effects]

According to the structures and the operations of the strain generation body 16B according to the third embodiment, at least the same advantage effects as those of the first embodiment can be obtained.

Moreover, the strain generation body 16B according to the third embodiment is configured as a three-beam system having three connecting parts 163 as beam parts. Thus, the 12 strain sensors Sa1 to Sb6 are provided on the connecting parts 163, and 12 reference resistors are provided on the center part 161 (FIG. 8 and FIG. 9).

In this manner, in the strain generation body 16B according to the third embodiment, sets of a strain sensor and a reference resistor, and wiring and electrodes connected thereto can be reduced, as compared to those on the strain generation bodies 16 and 16A of a four-beam system including four connecting parts 163. Therefore, the size of the strain generation body 16B can be reduced. Moreover, force and torque in six-axis directions can be detected with a minimum number of bridge circuits, and a manufacturing cost also can be reduced.

Fourth Embodiment [Example of Application to Force Sensor]

A fourth embodiment will be described with reference to FIG. 10 to FIG. 12. The fourth embodiment relates to an example of the application of the strain generation body 16 according to the first embodiment to a force sensor. The force sensor according to the fourth embodiment is used in, for example, a robot arm, and is a six-axis force sensor for detecting force and torque in X, Y, and Z directions.

[Structure]

Figure 10:
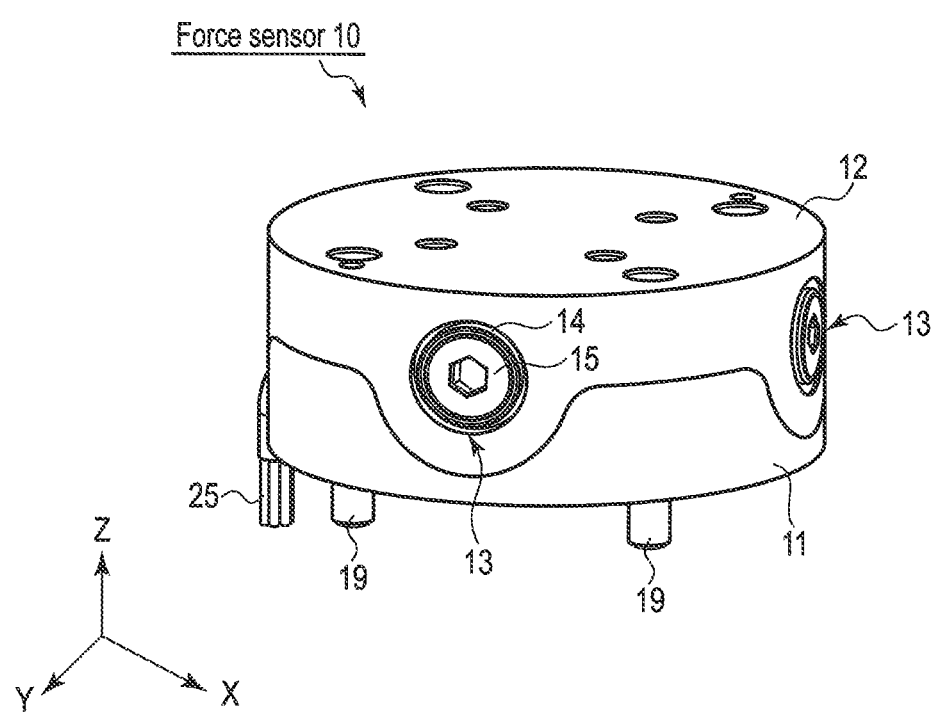
FIG. 10 is a perspective view showing the external appearance of a force sensor equipped with the strain generation body according to the first embodiment.

FIG. 10 is a perspective view showing the external appearance of a force sensor 10 equipped with the strain generation body 16 according to the first embodiment. FIG. 11 is an exploded perspective view showing the force sensor 10 of FIG. 10.

Figure 11:
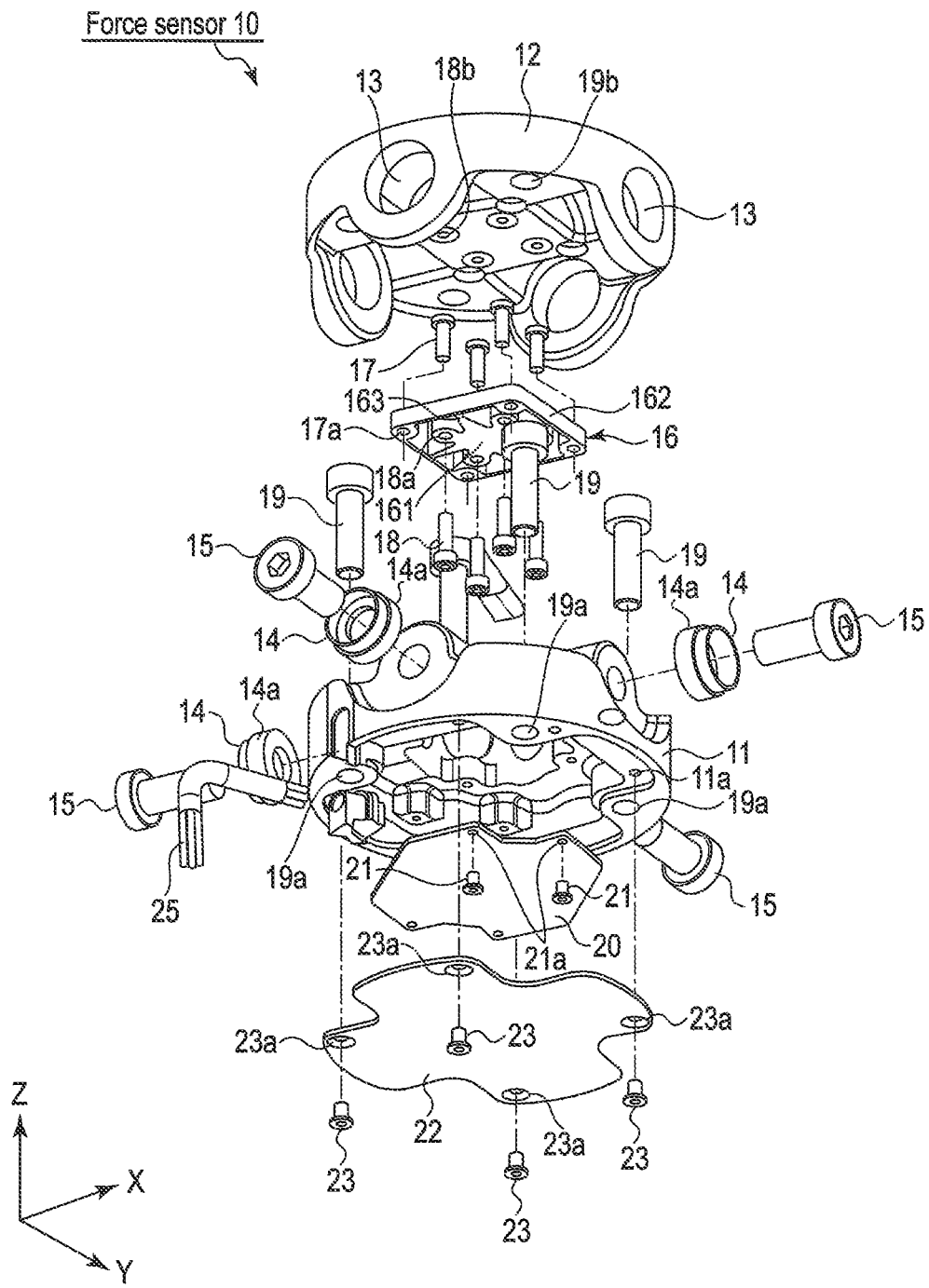
FIG. 11 is an exploded perspective view showing the force sensor of FIG. 10.

As shown in FIG. 10 and FIG. 11, the force sensor 10 comprises a cylindrical main body 11 and a cylindrical movable body 12 which is movable with respect to the main body 11. The main body 11 is fixed to a main body of a robot arm not shown in the figures with a plurality of mounting screws 19 which penetrate a plurality of screw holes 19a formed in the bottom of the main body 11. The movable body 12 has a function as a hand mounting plate for mounting a hand portion of the robot arm not shown in the figures on its top surface.

The main body (base) 11 is a base member serving as the main body of the force sensor 10, and the movable body 12 is mounted so as to be movable in six-axis directions (an X-axis direction, a Y-axis direction, a Z-axis direction, and directions of rotation around the axes) with respect to the main body 10 by the strain generation body 16 which is elastically deformable.

That is, as shown in FIG. 11, a center part 161 of the strain generation body 16 is fixed to the movable body (first support member) 12 with hand plate fixing screws 18 which penetrate screw holes 18a, respectively. An outer-peripheral part 162 of the strain generation body 16 is fixed to the main body 11 (second support member) with strain-generation-body fixing screws 17 which penetrate screw holes 17a, respectively.

The main surface and the back surface of the strain generation body 16 are disposed in parallel to a plane formed by the X axis and the Y axis, and a line perpendicularly passing through a center O of the strain generation body 16 corresponds to the Z axis. In the above-described structure, when external force is applied to the movable body 12, the movable body 12 moves, and connecting parts 163 of the strain generation body 16 are deformed. As described above, since the strain sensors Sa1 to Sb8 are provided on the connecting parts 163 of the strain generation body 16, the deformation of the strain generation body 16 is detected as an electrical signal by the strain sensors Sa1 to Sb8.

For example, four circular openings 13 are provided in the peripheral surface of the movable body 12 at regular intervals. That is, the openings 13 are disposed in the X-axis direction and the Y-axis direction. The number of openings 13 is not limited to four, and may be any number greater than or equal to three. Stoppers 14 are disposed inside the openings 13, respectively, and the stoppers 14 are fixed to the main body 11 with stopper-mounting bolts 15, respectively.

The stoppers 14 regulate the movement range of the movable body 12, and the outermost peripheral parts of the stoppers 14 are provided with first side surfaces 14a which the inner surfaces of the openings 13 can contact. That is, when the strain generation body 16 is deformed with the movement of the movable body 12, the inner surfaces of the openings 13 of the movable body 12 contact the first side surfaces 14a. Thus, the side surfaces 14a function as a protective mechanism which prevents the connecting parts 163 of the strain generation body 16 from being deformed excessively.

A board 20 is provided in the main body 11 so as to face the strain generation body 16. The board 20 comprises a plurality of screw holes 21a, and is fixed to the main body 11 with fixing screws 21 which penetrate the screw holes 21a, respectively. The strain sensors provided on the strain generation body 16 are electrically connected to the board 20. This will be described later in detail.

A cover 22 closing an opening 11a is attached to the bottom of the main body 11. That is, the cover 22 comprises a plurality of screw holes 23a, and is fixed to the main body 11 with fixing screws 23 which penetrate the screw holes 23a, respectively.

Wiring 25 for transmitting a detection signal to the outside is drawn to the side surface of the main body 11. The wiring 25 is electrically connected to the board 20.

Strain Generation Body in State of Being Mounted in Force Sensor

The strain generation body 16 in the state of being mounted in the force sensor 10 will be described in detail with reference to FIG. 12. FIG. 12 is a sectional view showing the strain generation body 16 in the state of being mounted in the force sensor 10.

As shown in FIG. 12, an insulating film 170 is provided on the main surface of the strain generation body 16, and an electrode 171 is provided on the insulating film 170. Moreover, an anisotropic conductive film (ACF) 181 is provided on the electrode 171 for being mounted in the force sensor 10. Lead wiring 182 for electrically connecting the electrode 171 and the board 20 is provided on the anisotropic conductive film 181. The lead wiring 182 herein comprises an insulating flexible film and a predetermined electric circuit laid on the film, and is flexible printed circuits (FPCs) which are bendable in accordance with the movement of the movable body 12. The lead wiring 182 is connected to the board 20. In addition, a protective sealant 183 is provided so as to cover the main surface of the strain generation body 16.

[Detection Operation]

The detection operation of the force sensor 10 having the above-described structure will be briefly described. Here, the case where external force (load) applied to a substantially center part of the movable body 12 in the Z-axis direction is detected will be described as an example.

When external force is applied to the substantially center portion of the movable body 12 in the Z-axis direction, the movable body 12 is moved downward along the Z-axis direction by the external force. Since the main body 11 is fixed and is not moved even by the external force, the movable body 12 moves downward until the inner surfaces of the openings 13 on the upper side are in contact with the first side surfaces 14a of the stoppers 14 on the upper side.

Thus, the bottom surface of the movable body 12 applies pressure to the top surface of the strain generation body 16, and the connecting parts 163 of the strain generation body 16, to which pressure has been applied, are deformed. Since the deformation of the strain generation body 16 is limited to a predetermined range by the stoppers 14, the strain generation body 16 is protected from destruction by excessive external force. The deformation of the strain generation body 16 is detected by the above-described strain sensors Sa1 to Sb8, and converted into an electrical signal by bridge circuits Ba1 to Bb4. The detected electrical signal is passed from the electrode 171 through the lead wiring 182 and the board 20 and transmitted to the outside via the wiring 25, and the external force can be detected.

Then, when the application of the external force to the movable body 12 is removed, the connecting parts 163 of the strain generation body 16 return to an original shape by elastic deformation.

The external-force detection operation in the Z axis direction has been herein described as an example. The same is true of the other external-force detection operations in the X-axis direction and the Y-axis direction. In addition, each of the torque detection operations in the X-axis, Y-axis, and Z-axis directions is also substantially the same as the above-described external-force detection operation, and thus, a detailed description thereof will be omitted.

[Advantageous Effects]

According to the structures and the operations of the force sensor 10 equipped with the strain generation body 16 according to the fourth embodiment, at least the same advantageous effects as those of the first embodiment can be obtained.

Moreover, the strain generation body 16 according to the present embodiment can be applied to the force sensor 10 as necessary.

In addition, the force sensor 10 comprises the stoppers 14 comprising the first side surfaces 14a, which can contact the inner surfaces of the openings 13, on their outermost peripheral parts. The stoppers 14 have a simple shape, and have a protective function for all the six-axis directions by regulating the movement range of the movable body 12. Thus, the force sensor 10, which is highly sensitive and has an advantage in reducing a manufacturing cost, can be provided.

MODIFIED EXAMPLE

While the first to fourth embodiments have been described as examples, the embodiments of the present invention are not limited to the strain generation bodies 16, 16A, and 16B according to the above-described first to third embodiments, and can be modified in various ways as necessary as a matter of course.

Moreover, objects to which the strain generation bodies 16, 16A, and 16B are applicable are not limited to the force sensor 10 described in the fourth embodiment, and they can be applied to various types of sensor as a matter of course.

In addition, the present invention is not limited to each of the above-described embodiments, and structural elements can be modified and embodied without departing from the spirit of the invention when the invention is put into practice. Moreover, various inventions can be made by combining a plurality of structural elements disclosed in each of the above described embodiments as appropriate. For example, several structural elements may be deleted from all structural elements disclosed in the embodiments. Furthermore, structural elements in different embodiments may be combined as appropriate.

What is claimed is:

1. A force sensor comprising:
   a strain generation body including:
      a center part,
      an outer-peripheral part surrounding a periphery of the center part,
      a plurality of connecting parts connecting the center part and the outer-peripheral part,
      a plurality of strain sensors being provided on main surfaces of the connecting parts, and
      a plurality of reference resistors being provided on a main surface of the center part and constituting bridge circuits together with the strain sensors;
   a cylindrical main body; and
   a cylindrical movable body which is movable with respect to the main body;
   at least three circular openings which are provided in a periphery of the movable body at regular intervals;
   stoppers that are disposed inside the openings, respectively, and that comprise first side surfaces having a first outside diameter less than a diameter of the openings; and
   a fixing member which fixes the stoppers to the main body, wherein:
   the center part of the strain generation body is connected to one of the main body and the movable body, which are support members, and
   the outer-peripheral part of the strain generation body is connected to the other of the main body and the movable body, which are the support members.

2. The force sensor of claim 1, wherein
   the center part is connected to an external first support member,
   the outer-peripheral part is connected to an external second support member, and
   elasticity of the outer-peripheral part and the connecting parts is greater than elasticity of the center part.

3. The force sensor of claim 1, wherein the strain generation body further includes:
   an electrode that extracts a detection signal of the bridge circuits, the electrode is provided on the main surface of the center part and is electrically connected to the strain sensors and the reference resistors; and
   wiring that is provided on the main surfaces of the center part and the connecting parts and electrically connects the strain sensors, the reference resistors, and the electrode.

4. The force sensor of claim 1, wherein the strain sensors are metallic thin-film resistors.

5. The force sensor of claim 4, wherein the strain sensors include chromium and nitrogen.

6. The force sensor of claim 3, wherein the strain sensors, the reference resistors, the electrode, and the wiring are laid out so as to be mirror-symmetrical with respect to diagonal lines connecting corners of the outer-peripheral part.

7. The force sensor of claim 1, wherein
   elastic deformation of the outer-peripheral part and the connecting parts caused by a movement of the movable body with respect to the main body is greater than elastic deformation of the center part.

8. The force sensor of claim 2, wherein the strain sensors are metallic thin-film resistors.

9. The force sensor of claim 8, wherein the strain sensors include chromium and nitrogen.

10. The force sensor of claim 3, wherein the strain sensors are metallic thin-film resistors.

11. The force sensor of claim 10, wherein the strain sensors include chromium and nitrogen.

* * * * *